(12) United States Patent
Goellner et al.

(10) Patent No.: US 10,480,567 B2
(45) Date of Patent: Nov. 19, 2019

(54) BALL ELEMENT WITH RETRACTING STUD

(71) Applicants: Alvin M. Goellner, Rockford, IL (US); Lonnie W. Miller, Roscoe, IL (US)

(72) Inventors: Alvin M. Goellner, Rockford, IL (US); Lonnie W. Miller, Roscoe, IL (US)

(73) Assignee: Advanced Machine & Engineering Co., Rockford, IL (US)

( * ) Notice: Subject to any disclaimer, the term of this patent is extended or adjusted under 35 U.S.C. 154(b) by 206 days.

(21) Appl. No.: 15/787,546

(22) Filed: Oct. 18, 2017

(65) Prior Publication Data

US 2019/0113071 A1    Apr. 18, 2019

(51) Int. Cl.
  *F16C 11/06* (2006.01)
  *F16C 11/12* (2006.01)

(52) U.S. Cl.
  CPC ...... *F16C 11/0614* (2013.01); *F16C 11/0604* (2013.01); *F16C 11/12* (2013.01); *F16C 2226/60* (2013.01)

(58) Field of Classification Search
  CPC ... Y10T 403/32713–32729; Y10T 403/32754; Y10T 403/32762; F16C 11/0604; F16C 11/0642; F16C 11/0647; F16C 11/06; F16C 11/0628; F16C 11/0633; F16C 11/0652; F16C 11/086
  See application file for complete search history.

(56) References Cited

U.S. PATENT DOCUMENTS

| | | | | |
|---|---|---|---|---|
| 1,919,797 A | * | 7/1933 | Maurer | F16C 11/0604 403/131 |
| 5,738,586 A | * | 4/1998 | Arriaga | B25B 13/06 464/106 |
| 6,902,343 B2 | * | 6/2005 | Hermens | E06B 3/5436 403/131 |
| 8,770,902 B1 | | 7/2014 | Miller | |

OTHER PUBLICATIONS

Elijah Tooling; Operating Instructions & Warranty AA02-015-021 Invert-A-Bolt™ Fastener; known prior to Oct. 18, 2017; 1 page.

* cited by examiner

*Primary Examiner* — Daniel J Wiley

(74) *Attorney, Agent, or Firm* — Reinhart Boerner Van Deuren P.C.

(57) ABSTRACT

Embodiments of the present invention provide a fixture element for attaching workpieces to a support, a bed, a tombstone, etc. of a machine tool. In particular, the fixture element has a retracting stud that allows for quick attachment of the workpiece. The fixture also includes a ball element that swivels to provide support for non-planar or multi-plane surfaces.

19 Claims, 5 Drawing Sheets

BALL ELEMENT WITH RETRACTING STUD

FIELD OF THE INVENTION

This invention generally relates to fasteners and more particularly to a fixture element for holding workpieces during machining.

BACKGROUND OF THE INVENTION

Automated machine tools, such as CNC machines, are prevalently used in the manufacturing industry. Such machines allow for faster production of workpieces, and moreover, the workpieces produced are more repeatable than traditional machining techniques, i.e., the dimensions of the workpieces produced are more uniform. In order to achieve such uniformity, it is important to uniformly position raw workpieces in the machining area. Nevertheless, precision placement of the raw workpiece increases the time preceding actual machining, thereby lessening the benefit of faster production offered by automated machine tools. Further, large workpieces require a large number of fasteners to attach the workpiece to the machine bed or tombstone. Thus, there is often a tradeoff between speed and repeatability when setting up a workpiece for automated machining.

The invention provides a fixture element configured to allow faster attachment of a workpiece to a machine bed or tombstone. The fixture element is also configured to support uneven surfaces of a workpiece so as to enhance the uniformity in placement of workpieces. These and other advantages of the invention, as well as additional inventive features, will be apparent from the description of the invention provided herein.

BRIEF SUMMARY OF THE INVENTION

Embodiments of the present invention provide a fixture element for attaching workpieces to a support, a bed, a tombstone, etc. of a machine tool. In particular, the fixture element has a retracting stud that allows for quick attachment of the workpiece. The fixture also includes a ball element that swivels to provide support for non-planar or multi-plane surfaces. Advantageously, the retracting stud and ball element allow for faster and more precise positioning of workpieces in the machining area.

In this paragraph, an exemplary embodiment of a fixture element according to the present invention is described. The fixture element includes a housing having a first portion and a second portion. The second portion defines a bore inside which an abutment region is located. The fixture element also includes a retracting stud having a first end and a second end. The second end includes a flange, and the retracting stud is configured for insertion in the bore such that first end extends through the first portion to an extent defined by engagement of the flange with the abutment region. Also included is a spring extending between the retracting stud and a disc. The disc is inserted in the bore at the end of the first portion opposite the abutment region. The spring biases the retracting stud towards the abutment region. Further, the fixture element includes a ball element seated in the first portion. The ball element surrounds the retracting stud, and the ball element is configured to swivel about the retracting stud.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of the present invention provide a fixture element for attaching workpieces to a support, a bed, a tombstone, etc. of a machine tool. In particular, the fixture element has a retracting stud that allows for quick attachment of the workpiece. The fixture also includes a ball element that swivels to provide support for non-planar or multi-plane surfaces. Advantageously, the retracting stud and ball element allow for faster and more precise positioning of workpieces in the machining area. Embodiments of the present invention are provided for the purposes of illustration and not by way of limitation. A person having ordinary skill in the art may recognize from this disclosure certain modifications that do not depart from the spirit or scope of the invention.

Figure 1:
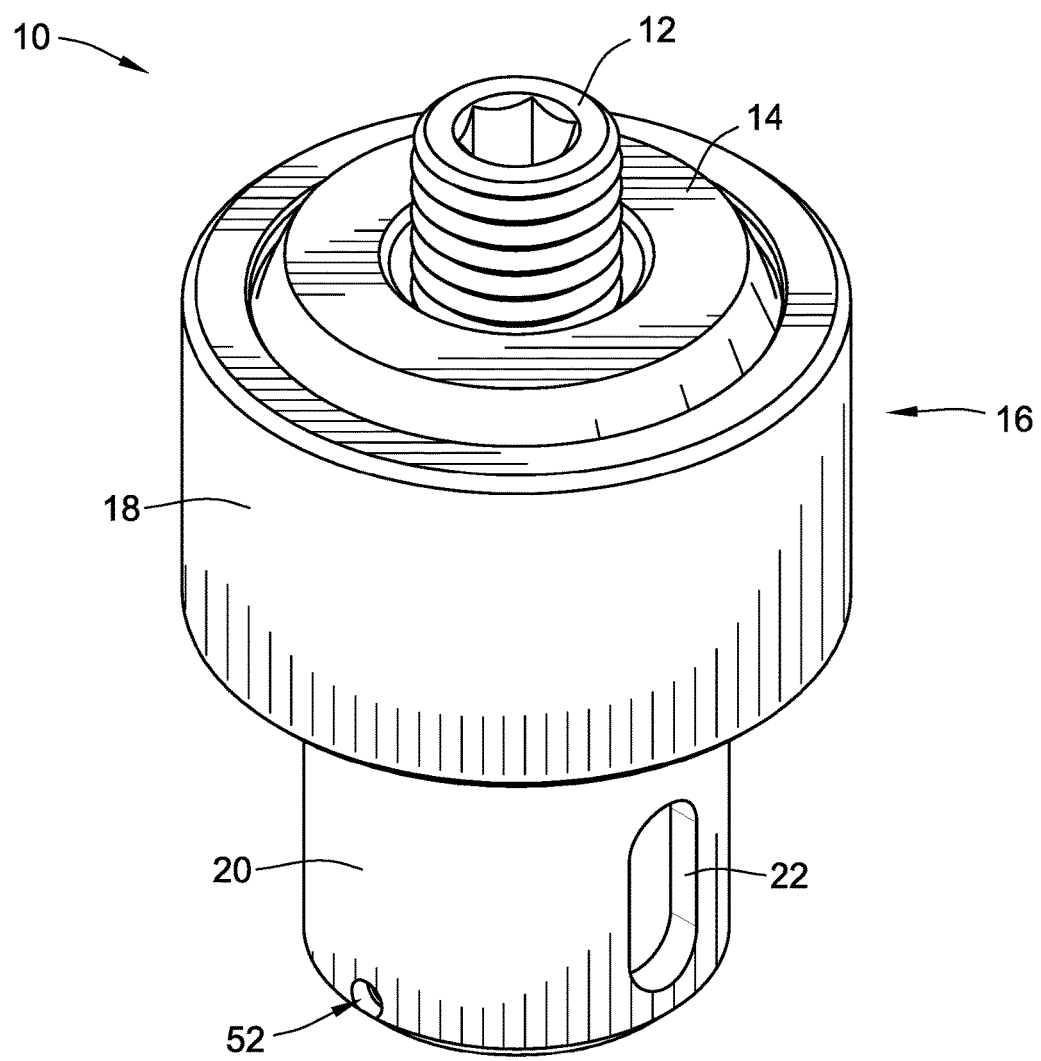
FIG. 1 is a perspective view of a fixture element, according to an exemplary embodiment.

FIG. 1 is a perspective view of a fixture element 10 having a retracting stud 12 and a ball element 14 contained at least partially within a housing 16. The housing 16 includes a first, upper portion 18 and a second, lower portion 20. In the embodiment depicted, the upper portion 18 and the lower portion 20 are cylindrical in shape, and the upper portion 18 has a larger outer diameter than the lower portion 20. The lower portion 20 is configured for insertion into a raised support, a machine bed, a tombstone, etc. As can be seen in FIG. 1, a slot 22 is defined in the lower portion 20, which allows for the lower portion 20 to be secured into the raised support, machine bed, tombstone etc. as will be discussed more fully below.

Figure 2:
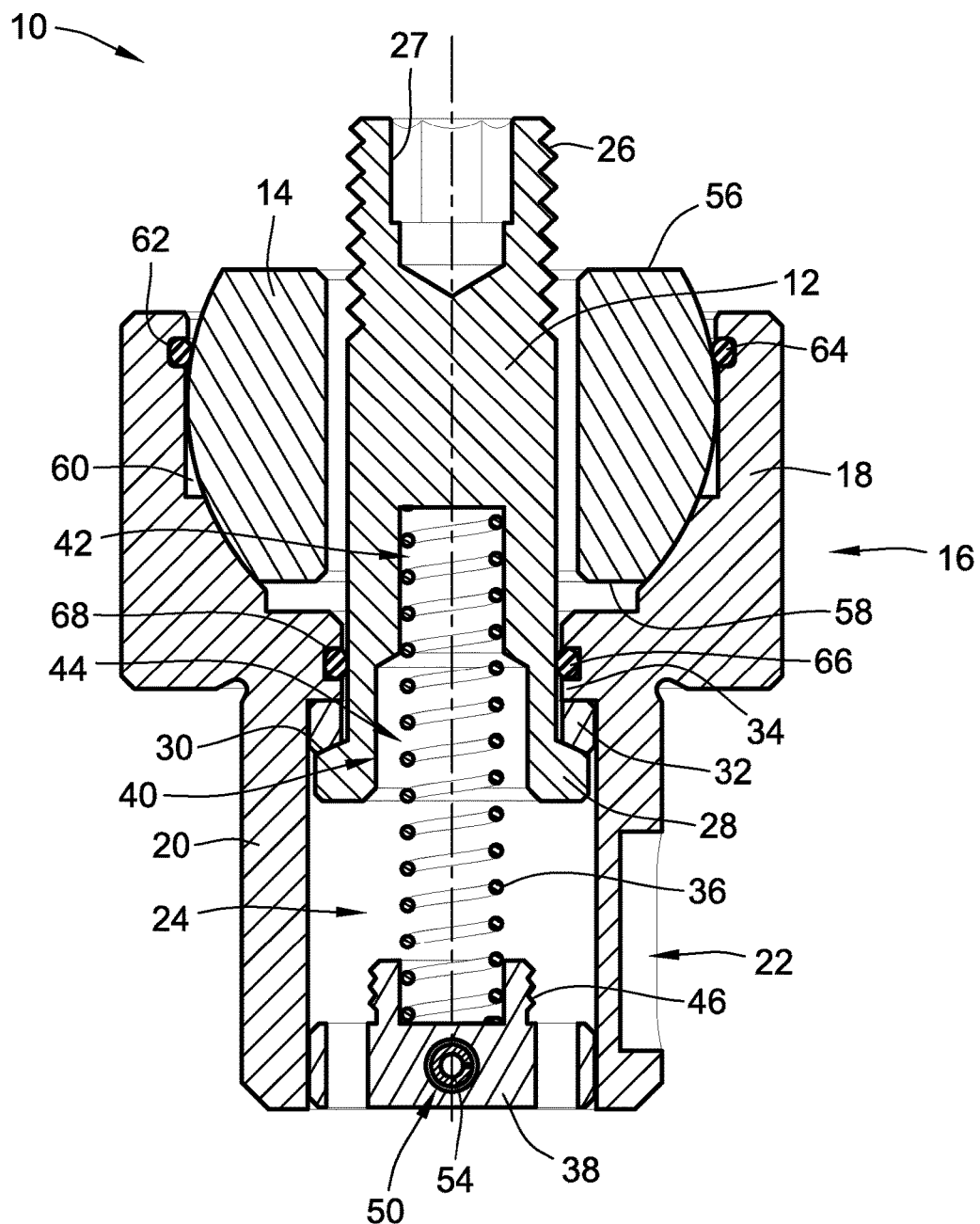
FIG. 2 is a cross-sectional view of the fixture element of FIG. 1.

FIG. 2 provides a cross-sectional view of FIG. 1, depicting the interior components of the fixture element 10. As can be seen in FIG. 2, a bore 24 is defined in the lower portion 20. The retracting stud 12 is inserted through the bore 24 such that a threaded end 26 of the retracting stud 12 extends through the upper portion 18. The threaded end 26 engages a workpiece to secure the workpiece to the fixture element 10. The engagement of the threaded end 26 with the workpiece is facilitated by a socket 27 formed on the interior of the threaded end 26. In this way, a tool, such as hex key, is able to engage the socket 27 so that a user can apply torque to the threaded end 26 in a manner that pulls the retracting stud 12 into engagement with complementary threads in the workpiece.

A flange 28 is located at the end of the retracting stud 12 opposite to the threaded end 26. The flange 28 has a rounded surface 30 configured to engage a countersunk washer 32. The rounded surface 30 of the flange 28 and the countersunk washer 32 provide a measure of tilt of the retracting stud 12 to facilitate alignment of the retracting stud 12 with a workpiece when fastening the workpiece to a work surface. The bore 24 narrows in diameter at the transition between the lower portion 20 and the upper portion 18 to define an abutment region 34. The abutment region 34 limits the vertical extent of retraction for the retracting stud 12 because the countersunk washer 32 and the flange 28 have a diameter that prevents movement through the ring defined by the abutment region 34. Accordingly, when the threaded end 26 is engaged with a workpiece, the mating of the threads forms a tight clamp by virtue of the contact between the flange 28 and the abutment region 34 via the countersunk washer 32.

The retracting stud 12 is biased in the fully extended position by a spring 36. Biasing the retracing stud 12 in this way facilitates aligning of a workpiece on the fixture element 10. To provide the bias, the spring 36 on one end is seated on a disc 38 located at the bottom of the lower region 20. At the other end, the spring 36 extends into a tapered channel 40 formed on the interior of the retracting stud 12. The tapered channel 40 includes a first section 42 that has a diameter matched to the outer diameter of the spring 36. This first section 42 of the tapered channel 40 ensures that the spring 36 does not work loose or kink during operation of the fixture element 10. The tapered channel 40 also includes a wider, second section 44 that accommodates the aforementioned tilt of the retracting stud 12 and that engages a threaded extension 46 projecting upwardly from the disc 38. In this way, the retracting stud 12 is able to be locked in a fully retracted position in which the spring 36 is compressed and the flange 28 is proximal to the disc 38. As shown in FIG. 2, the threaded extension 46 also provides a seat 48 into which the spring 36 is secured.

In order for the disc 38 to provide a surface against which the spring 36 pushes, the disc 38 must be secured to the lower portion 20. In an embodiment, the disc 38 includes a through hole 50 that extends across the width of the disc 38. The through hole 50 aligns with through holes 52 formed in the lower portion 20 (as shown in FIG. 1). A pin, such as a roll pin 54, is inserted into the through holes 50, 52 in the disc 38 and the lower portion 20. Rotation of the disc 38 about the axis defined by the roll pin 54, upon application of a downward force on the spring 36, is prevented by the thickness of the disc 38 and a close fit between the diameter of the disc 38 and the diameter of the bore 24.

Having described the retracting stud 12, attention is now turned to the ball element 14. The ball element 14 is seated in the upper portion 18, and the ball element 14 surrounds at least a portion of the retracting stud 12. Reference to the ball element 14 as a "ball" is not meant to imply that the ball element 14 is perfectly spherical; although, in certain embodiments, the ball element 14 can be more or less spherical than is shown in FIG. 2. Indeed, as shown in FIG. 2, the ball element 14 includes an upper surface 56 and a lower surface 58. The upper surface 56 is designed to engage an opposing surface of a workpiece when the retracting stud 12 is secured to the workpiece. In embodiments, the upper surface 56 is serrated to provide a rough surface, enhancing the frictional engagement between the upper surface 56 and the workpiece. In an embodiment, the serrations are up to 0.050". In a further embodiment, the serrations are greater than or equal to 0.025".

The upper portion 18 defines a cylindrical cavity 60. The cylindrical cavity 60 has a diameter that is matched to the diameter of the ball element 14. A first circumferential groove 62 is formed into the wall of the cylindrical cavity 60, and an O-ring 64 is seated into the first circumferential groove 62. In this way, the O-ring 64 secures the ball element 14 into the cylindrical cavity 60 of the upper portion 18.

Seating the ball element 14 in the cylindrical cavity 60 in this way allows the ball element 14 to swivel. In particular, the ball element 14 is able to swivel with respect to the retracting stud 12 such that the first surface 56 is able to move from a neutral position in which the first surface 56 is perpendicular to the retracting stud 12 to a swiveled position in which the first surface 56 is not perpendicular to the retracting stud 12. In embodiments, the first surface 56 of the ball element 14 is able to swivel from +/−5° to +/−10° from perpendicular with the retracting stud 12. In a preferred embodiment, the first surface 56 of the ball element 14 swivel +/−6° from perpendicular with the retracting stud 12.

The swivel provided by the ball element 14 helps to assure that a workpiece having an irregular or multi-planar surface is supported by the fixture element 10. Further, the swiveling ball element 14 facilitates alignment of the retracting stud 12 with the workpiece.

Having generally described the structure of the fixture element 10, certain features of the fixture element 10 are now described. In embodiments, the fixture element 10 is able to avoid the accumulation of debris in the bore 24 by including a gasket 66 in a groove 68 formed into the abutment region 34. In this way, the gasket 66 surrounds the retracting stud 12 so as to form a tight enough seal to prevent debris from passing around the retracting stud 12 but not so tight as to prevent vertical movement of the retracting stud 12 within the fixture element 10. In the event that debris is able to enter into the bore 24, the combination of roll pin 54 and through holes 50, 52 allows for removal of the disc 38 such that access is provided to the interior of the fixture element 10. For example, the disc 38 may be removed to clear debris (e.g., built up cutting fluid, lubricants, shavings, etc.) that has deposited in the fixture element 10.

Additionally, removal of the disc 38 permits reconfiguration of fixture element 10, such as to include a retracting stud 12 of a different length, width, thread type, etc. Further, removal of the disc 38 permits replacement of lost or damaged parts, such as the countersunk washer 32, retracting stud 12, spring 36, or the disc 38 itself. In a particular embodiment, the countersunk washer 32 is configured as a wearing part. That is, the countersunk washer 32 is formed of a softer material than the retracting stud 12 and the abutment region 34. Accordingly, the countersunk washer 32 is able to absorb frictional forces, and when wear reaches such a level that the countersunk washer 32 needs replacement, the removability of the disc 38 permits replacement of the countersunk washer 32.

Figure 3:
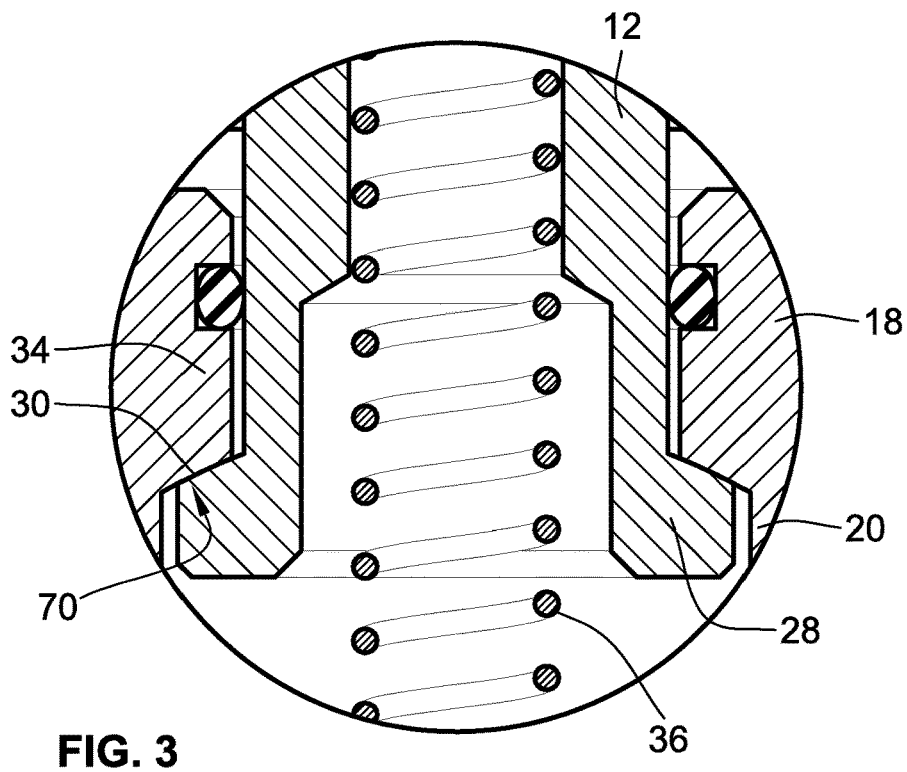
FIG. 3 is a cross-section view of a fixture element having a rounded flange surface, according to an exemplary embodiment.
Figure 4:
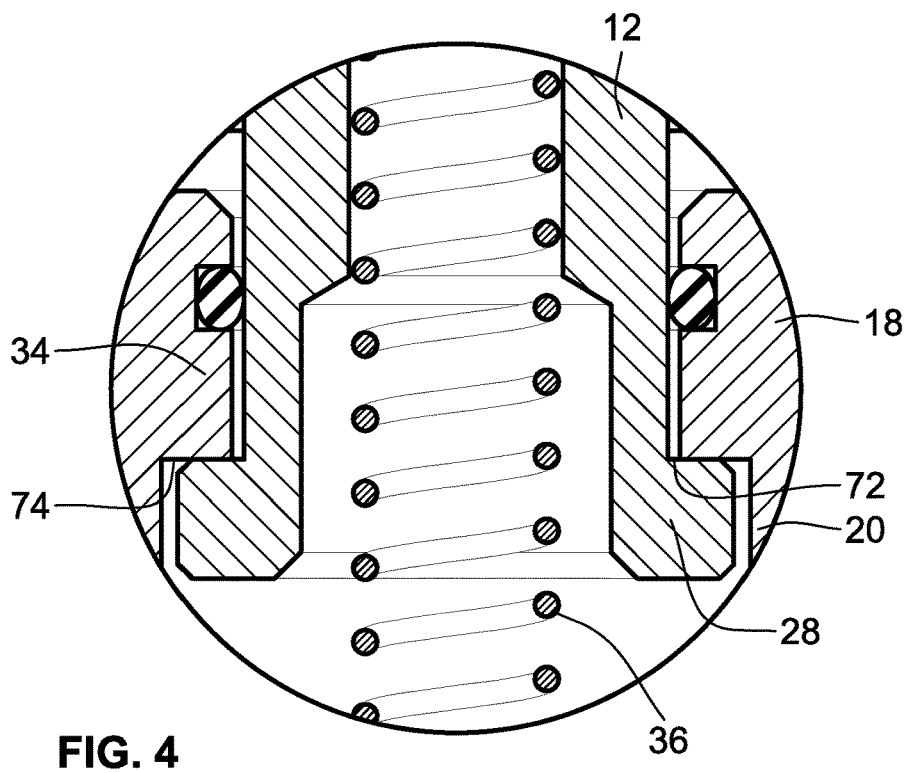
FIG. 4 is a cross-section view of a fixture element having a flat flange surface, according to an exemplary embodiment.

Having described the exemplary embodiment depicted in FIGS. 1 and 2, attention is turned to two other embodiments in which the countersunk washer 32 is omitted. In the first such embodiment depicted in FIG. 3, the rounded surface 30 of the flange 28 directly engages the abutment region 34. In this instance, the abutment region 34 forms a rounded pocket 70 into which the rounded surface 30 of the flange 28 is received. In FIG. 4, the flange 28 has a flat surface 72 instead of a rounded surface. Similarly, the abutment region 34 also has a flat surface 74. In this way, direct engagement between the flat surfaces 72, 74 of the flange 28 and the abutment region 34, respectively, limits the vertical movement of the retracting stud 12.

Figure 5:
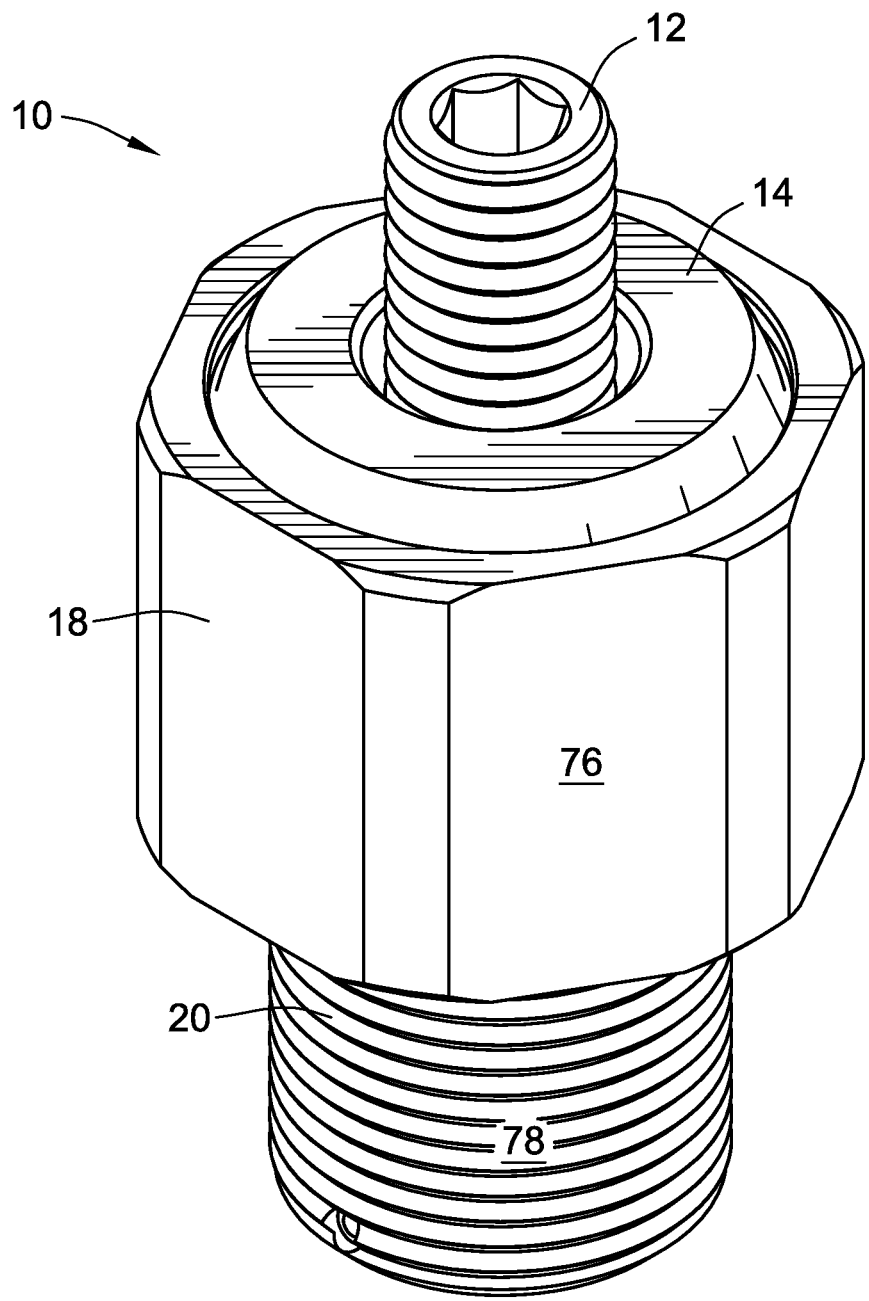
FIG. 5 depicts an embodiment of a fixture element in which the lower portion has a threaded peripheral surface and the upper portion has a multi-faceted peripheral surface.

In still other embodiments, the upper portion 18 and the lower portion 20 have specialized peripheral surfaces. For example, in FIG. 5, the upper portion 18 has a multi-faceted peripheral surface 76. As compared to the smooth, cylindrical surface depicted in the previous embodiments, the multi-faceted peripheral surface 76 provides gripping surfaces for a wrench or a clamp to engage the fixture element 10, e.g., for the purpose of securing or positioning the fixture element to a machine bed, support, tombstone, etc. As is also shown in FIG. 5, the lower portion 18 has a threaded peripheral surface 78, which allows the fixture element to be screwed into a mating aperture in, e.g., a machine bed, support, tombstone, etc. Further, while both a multi-faceted peripheral surface 76 and a threaded peripheral surface 78 are depicted in FIG. 5, other embodiments include only one of the multi-faceted peripheral surface 76 and the threaded peripheral surface 78 with the other peripheral surface being of a different variety, such as the smooth, cylindrical peripheral surface depicted in previous embodiments.

Figure 6:
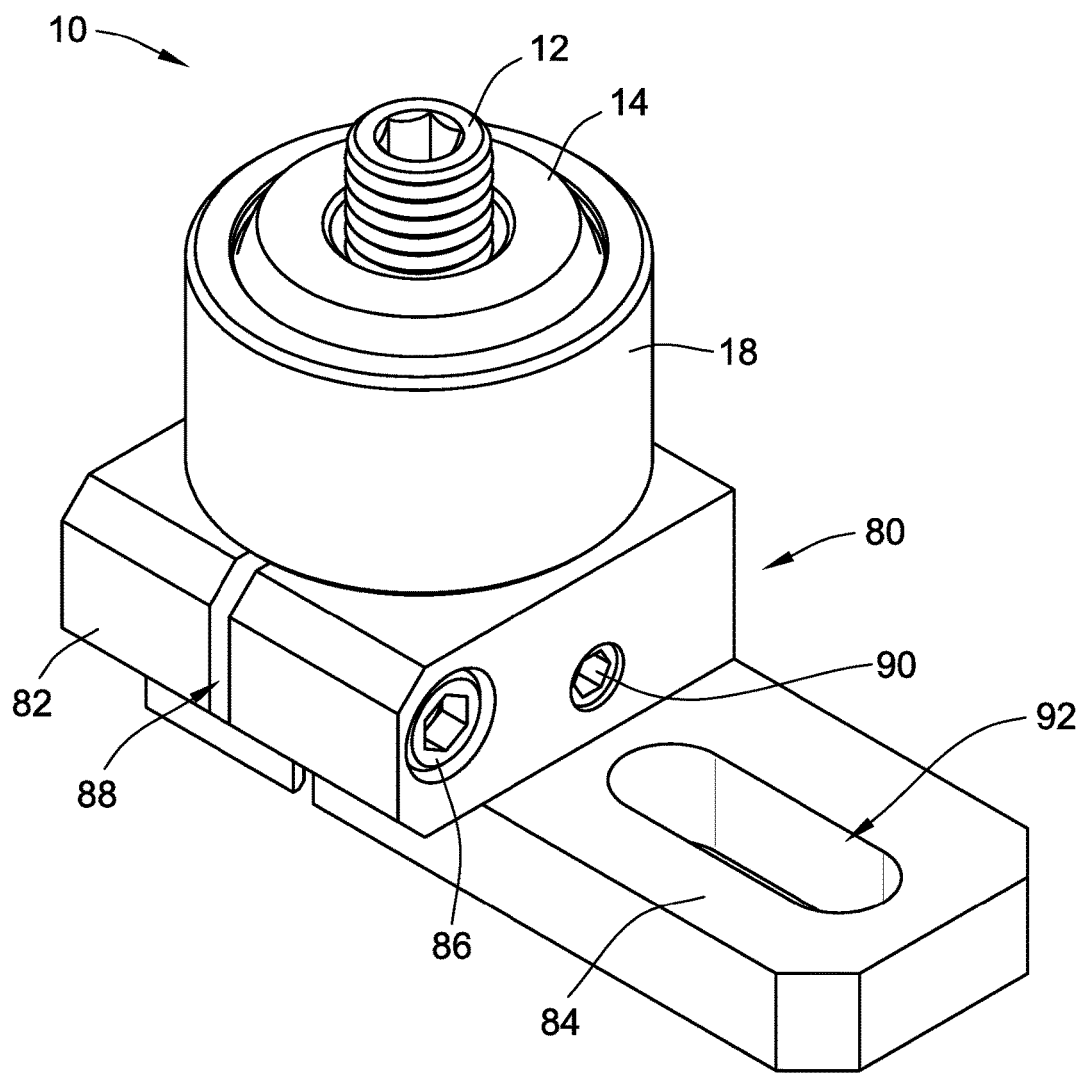
FIG. 6 is a perspective view of a fixture element mounted in a clamping support, according to an exemplary embodiment.

FIG. 6 depicts a fixture element 10 (such as the fixture element 10 of FIG. 1) inserted into a support 80. In particular, the support 80 includes a spring clamp 82 and a sliding positioning bar 84. The lower portion 20 (not shown) is inserted into the support 80, and the fixture element 10 is secured in place by the spring claim 82. The spring clamp 82 is tightened by rotating a bolt 86 to close a gap 88 between the arms of the spring clamp 82. The vertical position of fixture element 10 is fixed using a set screw 90. The set screw 90 engages the slot 22 of the lower portion 20 (as shown in FIG. 1). Thus, the combination of the spring clamp 82 and the set screw 90 fix the fixture element 10 in place on the support 80. The sliding positioning bar 84 is configured to position the support 80, and thus the fixture element 10, relative to a machine bed or a tombstone. For this purpose, a positioning slot 92 is provided such that a bolt or other fastener is able to be inserted at any point within the positioning slot 92 and tightened to clamp the sliding positioning bar 84 to the machine bed or tombstone.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fixture element, comprising:
    a housing having a first portion and a second portion, the second portion defining a bore in which an abutment region is located;
    a retracting stud having a first end and a second end, the second end including a flange, the retracting stud being configured for insertion in the bore such that the first end extends through the first portion to an extent defined by engagement of the flange with the abutment region;
    a spring extending between the retracting stud and a disc, the disc being inserted in the bore at the end of the first portion opposite the abutment region, the spring biasing the retracting stud towards the abutment region; and
    a ball element seated in the first portion and surrounding the retracting stud, the ball element being configured to swivel about the retracting stud.

2. The fixture element of claim 1, wherein the retracting stud includes an interior channel through the second end of the retracting stud and wherein the spring is inserted into the interior channel.

3. The fixture element of claim 2, wherein the disc includes a threaded extension configured to engage the interior channel of the retracting stud so as to secure the retracting stud in a retracted position.

4. The fixture element of claim 3, wherein the interior channel includes a first section and a second section in which the second section is wider than the first section, wherein the second section of the interior channel engages the threaded extension.

5. The fixture element of claim 1, wherein the flange has a flat surface that contacts the abutment region when the retracting stud is in a fully extended position.

6. The fixture element of claim 1, wherein the flange has a rounded surface that engages a rounded surface of the abutment region when the retracting stud is in a fully extended position.

7. The fixture element of claim 1, further comprising a countersunk washer;
    wherein the flange has a rounded surface configured to engage the countersunk washer; and
    wherein the washer engages the abutment region when the retracting stud is in a fully extended position.

8. The fixture element of claim 1, wherein the disc is configured to be removed from the bore such that access is provided to the interior of second portion.

9. The fixture element of claim 8, wherein a through hole is defined through the second portion and through the diameter of the disc, the through hole configured to receive a pin such that, when the pin is inserted into the through hole, the disc is secured to the second portion.

10. The fixture element of claim 1, wherein the disc includes at least one debris port formed through the thickness of the disc.

11. The fixture element of claim 1, wherein the ball element is configured to swivel such that a first surface adjacent to the first end of the retracting stud is up to +/−10° from perpendicular with a longitudinal axis of the retracting stud.

12. The fixture element of claim 1, wherein the first portion includes a cylindrical cavity having a diameter matching the diameter of the ball element, wherein a circumferential groove is formed into the wall of the cylindrical cavity, and wherein an O-ring is fitted into the circumferential groove such that the O-ring secures the ball element into the cylindrical cavity.

13. The fixture element of claim 1, wherein a circumferential groove is formed in the abutment region, wherein a gasket is fitted into the circumferential groove, and wherein the gasket engages the retracting stud.

14. The fixture element of claim 1, wherein a slot is formed into a peripheral surface of the second portion, the slot being configured to secure the fixture element to a positioning support.

15. The fixture element of claim 1, wherein the first end of the retracting stud includes a socket.

16. The fixture element of claim 1, wherein the ball element includes a first surface adjacent to the first end of the retracting stud, and wherein the first surface of the ball element is a serrated surface.

17. The fixture element of claim 1, wherein the spring is not compressed to solid height when the retracting stud is in a fully retracted position.

18. The fixture element of claim 1, wherein the second portion includes a threaded peripheral surface.

19. The fixture element of claim 1, wherein the first portion includes a faceted peripheral surface.

* * * * *